United States Patent
Sato

(10) Patent No.: US 10,311,813 B2
(45) Date of Patent: Jun. 4, 2019

(54) CONTROL DEVICE, DISPLAY DEVICE, CONTROL METHOD, AND STORAGE MEDIUM

(71) Applicant: SHARP KABUSHIKI KAISHA, Sakai, Osaka (JP)

(72) Inventor: Yuichi Sato, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/571,485

(22) PCT Filed: May 30, 2016

(86) PCT No.: PCT/JP2016/065875
§ 371 (c)(1),
(2) Date: Nov. 2, 2017

(87) PCT Pub. No.: WO2016/194864
PCT Pub. Date: Dec. 8, 2016

(65) Prior Publication Data
US 2018/0130433 A1 May 10, 2018

(30) Foreign Application Priority Data
Jun. 5, 2015 (JP) .................................. 2015-115193

(51) Int. Cl.
*G09G 3/36* (2006.01)
*G02F 1/133* (2006.01)

(52) U.S. Cl.
CPC ........... *G09G 3/3618* (2013.01); *G02F 1/133* (2013.01); *G09G 3/3614* (2013.01); *G09G 2320/0247* (2013.01); *G09G 2340/0435* (2013.01); *G09G 2360/16* (2013.01)

(58) Field of Classification Search
CPC .................... G09G 3/3614; G09G 2320/0247
See application file for complete search history.

(56) References Cited

U.S. PATENT DOCUMENTS

| | | |
|---|---|---|
| 2008/0291326 A1 | 11/2008 | Shishido et al. |
| 2009/0185082 A1 | 7/2009 | Hashimoto |
| 2014/0015870 A1 | 1/2014 | Takahashi et al. |
| 2014/0225881 A1 | 8/2014 | Takahashi et al. |
| 2014/0368484 A1* | 12/2014 | Tanaka .................. G09G 3/3648 345/208 |
| 2015/0002381 A1 | 1/2015 | Fujioka et al. |

FOREIGN PATENT DOCUMENTS

| | | |
|---|---|---|
| JP | 2009-003420 A1 | 1/2009 |
| JP | 2009-44438 A | 2/2009 |
| WO | 2013/024754 A1 | 2/2013 |
| WO | 2013/125406 A1 | 8/2013 |

\* cited by examiner

*Primary Examiner* — Gerald Johnson
(74) *Attorney, Agent, or Firm* — ScienBiziP, P.C.

(57) ABSTRACT

Electric power that a display device consumes in reversal of polarity is reduced. A display control section (3) includes: a refresh rate detecting section (31) which detects a refresh rate of a display device (100 or 200); and a polarity reversal control section (32 or 33) which controls reversal of polarity so as to be carried out at a frequency lower than the refresh rate.

7 Claims, 8 Drawing Sheets

CONTROL DEVICE, DISPLAY DEVICE, CONTROL METHOD, AND STORAGE MEDIUM

TECHNICAL FIELD

The present invention relates to a control device which controls polarity of a data signal to be written in each pixel of a display device, and the like.

BACKGROUND ART

A conventionally known liquid crystal display device is configured such that, for the purpose of prevention of image sticking on a display screen, polarity of a voltage outputted from a source driver is reversed for each frame so that polarity of a voltage (data potential) of a data signal to be written in each pixel is reversed each time refresh is carried out. In recent years, a technique has been developed in which, by increasing a refresh rate of a display screen so that the number of frames per second is increased, a moving image is displayed more smoothly. However, in a case where a refresh rate is increased, the number of times of reversal of polarity of a voltage outputted from a source driver per unit time is also increased. Therefore, there has been a problem that electric power consumed in charging and discharging each pixel and each data signal line is increased and, ultimately, electric power consumed in driving a display device is increased. According to the technique disclosed in Patent Literature 1, in order that this problem is solved, a driving method (dot reversal driving, column reversal driving, and the like) for reversal of polarity is changed depending on a refresh rate (depending on whether normal driving is carried out or double speed driving is carried out).

CITATION LIST

Patent Literature

[Patent Literature 1]
Japanese Patent Application Publication, Tokukai, No. 2009-44438 (publication date: Feb. 26, 2009)

SUMMARY OF INVENTION

Technical Problem

However, according to the technique disclosed in Patent Literature 1, since the driving method for reversal of polarity is merely changed, it is only possible to achieve an effect of reducing consumed electric power in a limited way.

The present invention has been made in view of the above problem, and an object of the present invention is to realize a control device and the like, each of which allows a reduction in electric power consumed in reversal of polarity in a display device.

Solution to Problem

In order to attain the above object, a control device in accordance with an aspect of the present invention is a control device capable of controlling a frequency of reversal of polarity of a data signal, which is to be written in each pixel of a display device, so as to be changed, including: a detecting section which detects a refresh rate of a display screen of the display device; and a polarity reversal control section which controls the reversal of the polarity so as to be carried out at a frequency lower than the refresh rate which the detecting section has detected.

In order to attain the above object, a control method in accordance with an aspect of the present invention is a control method carried out by a control device capable of controlling a frequency of reversal of polarity of a data signal, which is to be written in each pixel of a display device, so as to be changed, the method including: a detecting step of detecting a refresh rate of a display screen of the display device; and a polarity reversal controlling step of controlling the reversal of the polarity so as to be carried out at a frequency lower than the refresh rate detected in the detecting step.

Advantageous Effects of Invention

According to an aspect of the present invention, it is possible to reduce electric power consumed in reversal of polarity in a display device.

DESCRIPTION OF EMBODIMENTS

[Embodiment 1]

Figure 1:
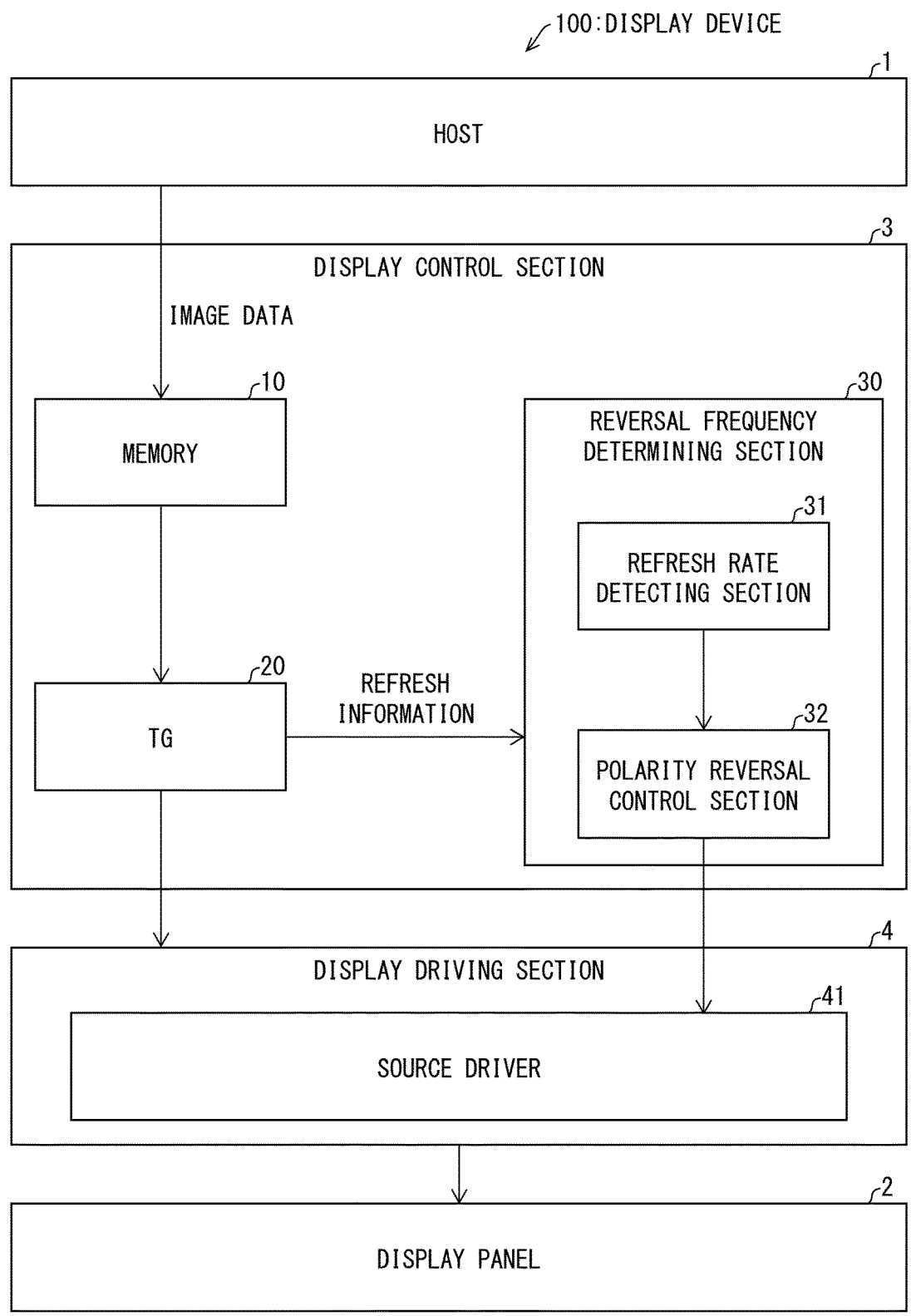
FIG. 1 is a block diagram illustrating a configuration of a main part of a display device in accordance with Embodiment 1 of the present invention.

The following description will discuss Embodiment 1 of the present invention with reference to FIGS. 1 to 4. FIG. 1 is a view illustrating a configuration of a main part of a display device 100 in accordance with Embodiment 1. Note that Embodiment 1 will be described on the premise that the display device 100 is a liquid crystal display device. However, a configuration and a function of the display device 100 is applicable to any display device other than the liquid crystal display device, provided that the any display device is configured such that reversal of polarity (later described) is carried out. As illustrated in FIG. 1, the display device 100 includes a host 1, a display control section (control device) 3, a display driving section 4, and a display panel 2.

<<Configuration of Main Part>>

The display panel 2 serves as a display screen of the display device 100. The display panel 2 includes a plurality of pixels. A data signal, corresponding to image data to be displayed, is written in the plurality of pixels via source lines (data signal lines), so that an image which the image data indicates is displayed on the display panel 2. Note that the "image data" is data which indicates a still image or an image corresponding to 1 (one) frame constituting a moving image.

The display driving section 4 is a driver which causes the display panel 2 to be driven. The display driving section 4 is realized as, for example, a control circuit provided on a substrate of the display panel 2. The display driving section 4 is a driver which is capable of (i) selecting any one of a plurality of refresh rates depending on a signal (timing signal) that the display driving section 4 has received from the display control section 3 and that indicates a timing at which the display panel 2 is to be driven and (ii) causing the display panel 2 to be driven at such a selected one of the plurality of refresh rates. In Embodiment 1, it is assumed, as an example, that the display driving section 4 causes the display panel 2 to be driven at a refresh rate of 60 Hz or 120 Hz. However, setting of the refresh rate of the display panel 2 is not limited to such. For example, the display driving section 4 can be alternatively configured so as to adjust the refresh rate of the display panel 2 by 1 (one) Hz. Hereinafter, causing the display panel 2 to be driven at the refresh rate of 60 Hz will be referred to as "normal driving," whereas causing the display panel 2 to be driven at the refresh rate of 120 Hz will be referred to as "high-speed refresh driving." In a case where the display driving section 4 receives a timing signal and image data from the display control section 3, the display driving section 4 controls the display panel 2 so that the image data is displayed (a screen is refreshed) at a timing which the timing signal specifies. The display driving section 4 includes a driver necessary to cause the display panel 2 to be driven, and at least includes a source driver 41.

The source driver 41 is a driver which applies, to the respective source lines of the display panel 2, voltages each of which varies depending on image data. The source driver 41 applies, to the respective source lines, voltages each of which varies depending on image data, at a timing which a timing signal specifies. This causes a data signal, corresponding to the image data, to be written in each of the plurality of pixels of the display panel 2. That is, an image which the image data indicates is displayed on the display panel 2 (the screen of the display panel 2 is refreshed).

Here, the voltages which the source driver 41 applies to the respective source lines are alternating-current voltages. Therefore, polarity of the data signal is reversed in a cycle corresponding to respective frequencies of the alternating-current voltages. Note that, as used herein, the "polarity of the data signal" is polarity based on a potential of a common electrode which faces pixel electrodes of the display screen. In other words, the source driver 41 changes the respective frequencies of the alternating-current voltages, which the source driver 41 is to apply to the respective source lines, so that a frequency of reversal of the polarity of the data signal, which frequency corresponds to the respective frequencies of the alternating-current voltages, is changed. Hereinafter, the reversal of the polarity of the data signal will be also referred to as merely "polarity reversal." The respective frequencies of the alternating-current voltages which the source driver 41 is to apply to the respective source lines are controlled by the display control section 3. Note that how the source driver 41 applies the alternating-current voltages to the respective source lines (polarity reversal method) is not limited in particular. For example, the source driver 41 can employ, as the polarity reversal method, any one of a frame reversal driving method, a column reversal driving method, a line reversal driving method, and a dot reversal driving method.

The host 1 obtains or generates image data to be displayed on the display panel 2, and transfers the image data to the display control section 3. Together with the image data, the host 1 can also transmit, to the display control section 3, an image rewriting frag (time reference) which indicates a timing at which the image data is to be displayed on the display panel 2. Note that format of the image data is not limited in particular, provided that the image data can be displayed on the display panel 2.

The display control section 3 transmits, to display driving section 4, (i) image data to be used for refresh of the display panel 2 and (ii) a timing at which the refresh is to be carried out. Furthermore, the display control section 3 controls reversal of polarity of a data signal which reversal is caused to be carried out by the display driving section 4. More specifically, the display control section 3 includes a memory 10, a TG (timing generator) 20, and a reversal frequency determining section 30. The memory 10 is a memory which temporarily stores therein image data that the memory 10 has received from the host 1. The memory 10 holds therein written image data, until the memory 10 receives next image data from the host 1 (until the memory 10 is overwritten).

The TG 20 generates a timing signal. In a case where image data which the memory 10 holds therein is changed (that is, new image data is transferred from the host 1 to the memory 10), the TG 20 reads the image data from the memory 10, and transmits the image data and the timing signal to the display driving section 4. When the TG 20 transmits the timing signal to the display driving section 4, the TG 20 transmits refresh information to the reversal frequency determining section 30. Note, here, that the "refresh information" is information which at least includes information that indicates a timing at which refresh of the display panel 2 is to be carried out. Note that the TG 20 can determine, in accordance with an interval at which the TG 20 generates timing signals, a refresh method by which the display panel 2 is refreshed (whether the high-speed refresh driving (later described) is carried out or the normal driving (later described) is carried out), and include, in the refresh information, also (i) information which indicates whether or not refresh is to be carried out and/or (ii), instead of the information which indicates whether or not refresh is to be carried out, information which indicates the refresh method. Note also that the TG 20 can be configured so as to, in a case where given time has elapsed since the above transmission, (i) read the image data (the same image data as one that the TG 20 has transmitted) again from the memory 10 and (ii) transmit the image data and a timing signal to the display driving section 4. This makes it possible for the TG 20 to cause the display panel 2 to be refreshed every given time even in a case where new image data is not transferred from the host 1 to the memory 10. Note also that the TG 20 can generate a timing signal in accordance with time reference received from the host 1.

The reversal frequency determining section 30 is a display controller which (i) determines, in accordance with refresh information, respective frequencies of alternating-current voltages which the source driver 41 is to apply to the respective source lines (that is, determines a frequency of reversal of polarity of a data signal) and (ii) controls the source driver 41 so as to apply, to the respective source lines, the alternating-current voltages having respective determined frequencies. The reversal frequency determining section 30 includes a refresh rate detecting section (detecting section) 31 and a polarity reversal control section 32. In a case where the reversal frequency determining section 30 receives refresh information from the TG 20, the refresh rate detecting section 31 first detects a refresh rate, and then, in accordance with a result of such detection, the polarity reversal control section 32 determines a frequency of reversal of polarity and carries out control of the source driver 41.

The refresh rate detecting section 31 detects, from refresh information, a refresh rate of the display panel 2. Note that how the refresh rate detecting section 31 detects the refresh rate is not limited in particular. For example, the refresh rate detecting section 31 can determine the refresh rate of the display panel 2 in accordance with an time interval at which the reversal frequency determining section 30 receives pieces of refresh information from the TG 20. In a case where the refresh information includes information that indicates the refresh method by which the display panel 2 is refreshed, the refresh rate detecting section 31 can determine the refresh rate in accordance with the refresh method. For example, in a case where the refresh method is the normal driving, the refresh rate is 60 Hz. In a case where the refresh method is the high-speed refresh driving, the refresh rate is 120 Hz.

The polarity reversal control section 32 controls, in accordance with a refresh rate which the refresh rate detecting section 31 has detected, respective frequencies of alternating-current voltages which the source driver 41 is to apply to the respective source lines. More specifically, the polarity reversal control section 32 determines a frequency of reversal of polarity in accordance with the refresh rate, and controls the source driver 41 so that the reversal of the polarity is carried at the frequency thus determined.

(Polarity Reversal Control Process)

Figure 2:
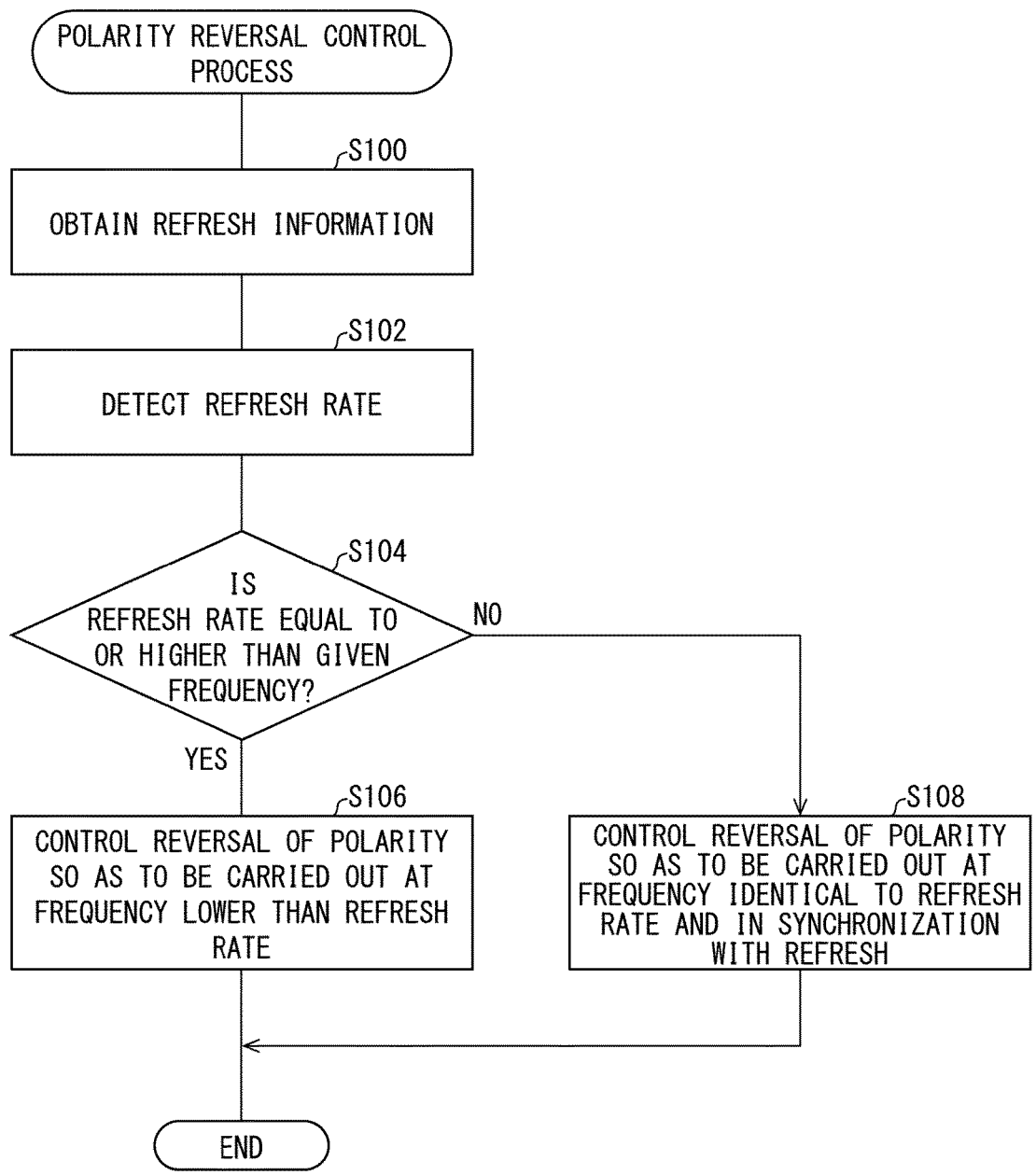
FIG. 2 is a flowchart illustrating a flow of a polarity reversal control process which a reversal frequency determining section of the display device carries out.

Here, how the reversal frequency determining section 30 (i) determines a frequency of reversal of polarity in accordance with refresh information and (ii) carries out control (polarity reversal control process, control method) will be described below with reference to FIG. 2. FIG. 2 is a flowchart illustrating a flow of the polarity reversal control process. In a case where the reversal frequency determining section 30 obtains refresh information from the TG 20 (S100), the refresh rate detecting section 31 detects a refresh rate of the display panel 2 from the refresh information (S102, detecting step). In a case where the refresh rate detecting section 31 detects the refresh rate of the display panel 2, the polarity reversal control section 32 determines whether or not the refresh rate, which the refresh rate detecting section 31 has detected, is equal to or higher than a given frequency (S104).

In a case where the refresh rate is equal to or higher than the given frequency (YES, in S104), the polarity reversal control section 32 controls the source driver 41 so that reversal of polarity of a data signal is carried out at a frequency lower than the refresh rate, by controlling respective frequencies of alternating-current voltages which the source driver 41 is to apply to the respective source lines (S106, polarity reversal controlling step). That is, it can be said that the polarity reversal control section 32 reduces the number of times of the reversal of the polarity of the data signal which reversal is caused to be carried out by the source driver 41, as compared with a case where the reversal of the polarity of the data signal is caused to be carried out in synchronization with a timing of refresh.

In a case where the refresh rate is lower than the given frequency (NO, in S104), the polarity reversal control section 32 controls the source driver 41 so that the reversal of the polarity of the data signal is carried out at a frequency identical to the refresh rate and in synchronization with refresh (S108). In other words, the polarity reversal control section 32 does not reduce the number of times of the above-described reversal of the polarity.

Note that a value of the "given frequency" can be determined as appropriate in accordance with (i) the polarity reversal method which the source driver 41 employs and (ii) the refresh rate of the display panel 2 which refresh rate the display driving section 4 can set. In particular, the given frequency is preferably set to such a frequency that flicker of an image becomes unlikely to be visually recognized on the display panel 2. Note, here, that a state where "flicker of an image is unlikely to be visually recognized" indicates a state where flicker can be hardly visually recognized when the display screen of the display panel 2 is viewed with a human eye. In a case where a refresh rate of the display screen is equal to or higher than a specific frequency (for example, approximately 50 Hz according to a general liquid crystal display device, but not limited to 50 Hz), flicker of the display screen is unlikely to be visually recognized. Therefore, the given frequency is preferably equal to or higher than a frequency at which flicker becomes unlikely to be visually recognized.

Furthermore, the given frequency is preferably higher than a minimum refresh rate at which the display panel 2 and the display driving section 4 can be driven. That is, according to Embodiment 1, the given frequency is preferably higher than at least 60 Hz. Note that the value of the given frequency can be higher than that of a refresh rate (60 Hz) of a general display device.

Note that the following description will take as an example a case where the given frequency is 120 Hz. That is, in a case where the refresh rate of the display panel 2 is equal to or higher than 120 Hz, i.e., in a case where the high-speed refresh driving is carried out, the polarity reversal control section 32 controls the source driver 41 so that the respective frequencies of the alternating-current voltages, which the source driver 41 is to apply to the respective source lines, are lower than 120 Hz (for example, 60 Hz).

<<Timings of Image Rewriting and Polarity Reversal>>

Figure 3:
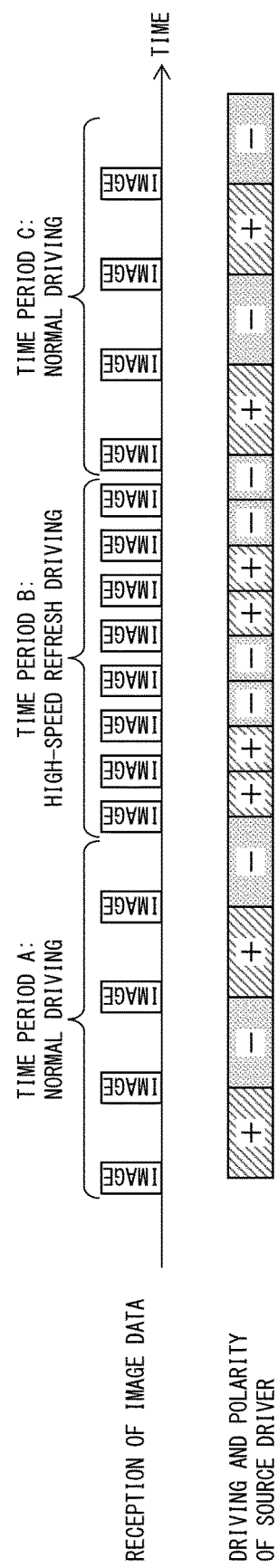
FIG. 3 is a view illustrating a relationship, among (i) a refresh rate of a display panel, (ii) a timing at which a source driver is driven, and (iii) polarity of a data signal corresponding to the source driver which is being driven, in the display device.

Finally, a relationship, among (i) a refresh rate of the display panel 2, (ii) a timing at which the source driver 41 is driven, and (iii) polarity of a data signal corresponding to the source driver 41 which is being driven, will be described below with reference to FIG. 3. FIG. 3 is a view illustrating a relationship among (i) a refresh rate of the display panel 2, (ii) a timing at which the source driver 41 is driven, and (iii) polarity of a data signal corresponding to the source driver 41 which is being driven. In FIG. 3, a row "reception of image data" indicates a timing at which the display control section 3 receives image data from the host 1 and stores the image data in the memory 10. A quadrangular compartment shown in a row "driving and polarity of source driver" indicates a time period (1 (one) vertical period) during which the source driver 41 is driven and which corresponds to 1 (one) frame, and shows therein a sign "+" or "−." FIG. 3 and the drawings subsequent to FIG. 3 each illustrate, as an example, a case where the display panel 2 carries out full white display. Note, however, that the following process is similarly carried out also in a case where the display panel 2 carries out display other than the solid white display.

In a case where the display control section 3 starts to receive image data from the host 1, the display control section 3 sequentially stores, in the memory, the image data thus received. In a case where the image data starts to be stored in the memory 10, the TG 20 reads the image data which is being stored in the memory 10, and transmits, to the display driving section 4, the image data together with a timing signal. In so doing, the TG 20 transmits refresh information to the reversal frequency determining section 30. The reversal frequency determining section 30 carries out the above-described polarity reversal control process so as to control respective frequencies of alternating-current voltages which the source driver 41 is to output. As a result, as illustrated in FIG. 3, after a delay of a small amount of time from a start of reception of the image data from the host 1, the source driver 41 is driven (that is, a data signal is written in each of the plurality of pixels of the display panel 2), so that the display panel 2 is refreshed.

In a case of the normal driving in time periods A and C, the polarity reversal control section 32 controls the respective frequencies of the alternating-current voltages, which the source driver 41 is to output, so that a frequency of reversal of polarity of the data signal is identical to a refresh rate of the display panel 2, and controls the source driver 41 so that a timing of the reversal of the polarity is in synchronization with a timing of refresh. In a case of the high-speed refresh driving in a time period B, the polarity reversal control section 32 controls the respective frequencies of the alternating-current voltages, which the source driver 41 is to output, so that the frequency of the reversal of the polarity is lower than the refresh rate. Specifically, the frequency of the reversal of the polarity, which reversal is caused to be carried out by the source driver 41, remains unchanged from that in the normal driving, and is 60 Hz. In other words, in the time period B, the source driver 41 causes the reversal of the polarity of the data signal to be carried out once every time refresh of the display panel 2 is carried out twice. With reference to the row "driving and polarity of source driver," in even-numbered refresh in the time period B, the reversal of the polarity is not carried out although refresh is carried out.

In this manner, the polarity reversal control section 32 controls the frequency of the reversal of the polarity so as to be lower than the refresh rate of the display screen. This allows a reduction in number of times of the reversal of the polarity per unit time, as compared with a case where the frequency of the reversal of the polarity is controlled so as to be identical to the refresh rate of the display screen (it is possible to cause a cycle of the reversal of the polarity to be longer). Therefore, it is possible to reduce electric power consumed in the reversal of the polarity, for example, electric power consumed in charging and discharging the plurality of pixels and the data signal lines for the reversal of the polarity.

Further, in a case where the refresh rate of the display panel 2 is equal to or higher than the given frequency, the polarity reversal control section 32 controls the frequency of the reversal of the polarity so as to be lower than the refresh rate. Note, here, that, in a case where the given frequency is set so as to be equal to or higher than the frequency at which flicker becomes unlikely to be visually recognized on the display screen of the display panel 2, the polarity reversal control section 32 controls the frequency of the reversal of the polarity so as to be lowered when the refresh rate is high to such an extent that flicker is unlikely to be visually recognized. Therefore, it is possible to reduce electric power consumed in the reversal of the polarity, while maintaining a quality of display of image data on the display panel 2.

Figure 4:
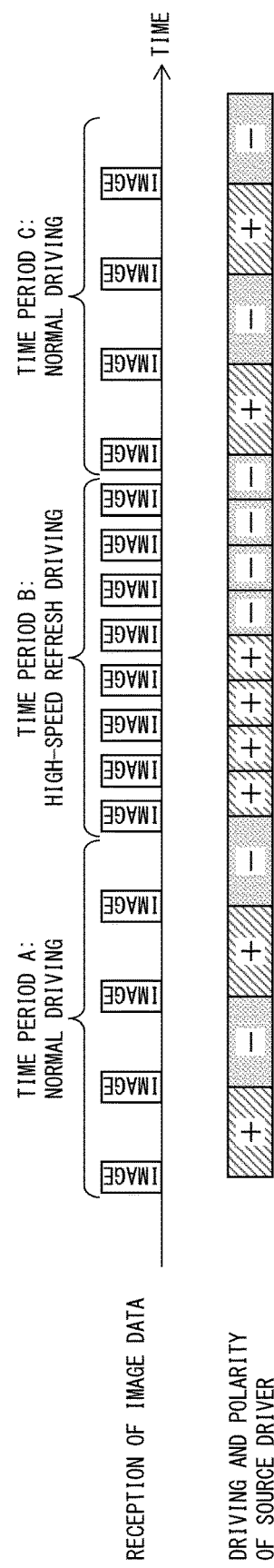
FIG. 4 is a view illustrating another example relationship, among (i) a refresh rate of the display panel, (ii) a timing at which the source driver is driven, and (iii) polarity of a data signal corresponding to the source driver which is being driven, in the display device.

Note that, in a case where the refresh rate of display panel 2 is equal to or higher than the given frequency (refresh rate in a case where the high-speed refresh driving is carried out) (YES, in S104), the polarity reversal control section 32 can control the respective frequencies of the alternating-current voltages, which the source driver 41 is to apply to the respective source lines, so as to be lower than 60 Hz (refresh rate in a case where the normal driving is carried out, second refresh rate). In other words, in Embodiment 1, in a case where the frequency of the reversal of the polarity is lowered, to what degree the frequency is lowered is not limited in particular. The following description will discuss a variation of Embodiment 1 with reference to FIG. 4. FIG. 4 is a view illustrating another example relationship among (i) a refresh rate of the display panel 2, (ii) a timing at which the source driver 41 is driven, and (iii) polarity of a data signal corresponding to the source driver 41 which is being driven. Note that description of part of FIG. 4 which part is similar to FIG. 3 will be omitted. The same applies to FIGS. 7 and 8.

In FIG. 4, in a case of the high-speed refresh driving in a time period B, the polarity reversal control section 32 controls respective frequencies of alternating-current voltages, which the source driver 41 is to output, so that frequency of reversal of polarity of a data signal is lower than a refresh rate in the normal driving. Specifically, as illustrated in a row "driving and polarity of source driver," the frequency of the reversal of the polarity is 30 Hz which is a frequency lower than that in the normal driving. In other words, in the time period B, the source driver 41 causes the reversal of the polarity of the data signal to he carried out once every time refresh of the display panel 2 is carried out four times. This allows a further reduction in electric power consumed in the reversal of the polarity, as compared with a case where the frequency of the reversal of the polarity is lowered to a frequency (60 Hz) identical to that in the normal driving.

Note that, also in a case where the display panel 2 is driven as in an example illustrated in FIG. 4, a frequency (given frequency) in accordance with which determination in S104 illustrated in FIG. 2 is made is preferably set to such a frequency that flicker is unlikely to be visually recognized. This is because, in a case where a frequency of the refresh rate is equal to or higher than the given frequency, flicker is unlikely to be visually recognized, as compared with a case where the frequency of the refresh rate is lower than the given frequency, even in a case where the frequency of the reversal of the polarity is significantly lowered. This makes it possible to further reduce electric power consumed in the reversal of the polarity, while maintaining a quality of display on the display panel 2.

[Embodiment 2]

The polarity reversal control section 32 in accordance with an embodiment of the present invention can be configured so as to determine a frequency of reversal of polarity in consideration of whether or not an image which image data indicates has such a characteristic that flicker is likely to be visually recognized by a user when the image is displayed on the display panel 2. The following description will discuss Embodiment 2 of the present invention with reference to FIGS. 5 to 7. Note that, for convenience, identical reference numerals will be given to respective members having functions identical to those of members having been described in the foregoing embodiment, and description of the members will be omitted, in each embodiment below.

<<Configuration of Main Part>>

Figure 5:
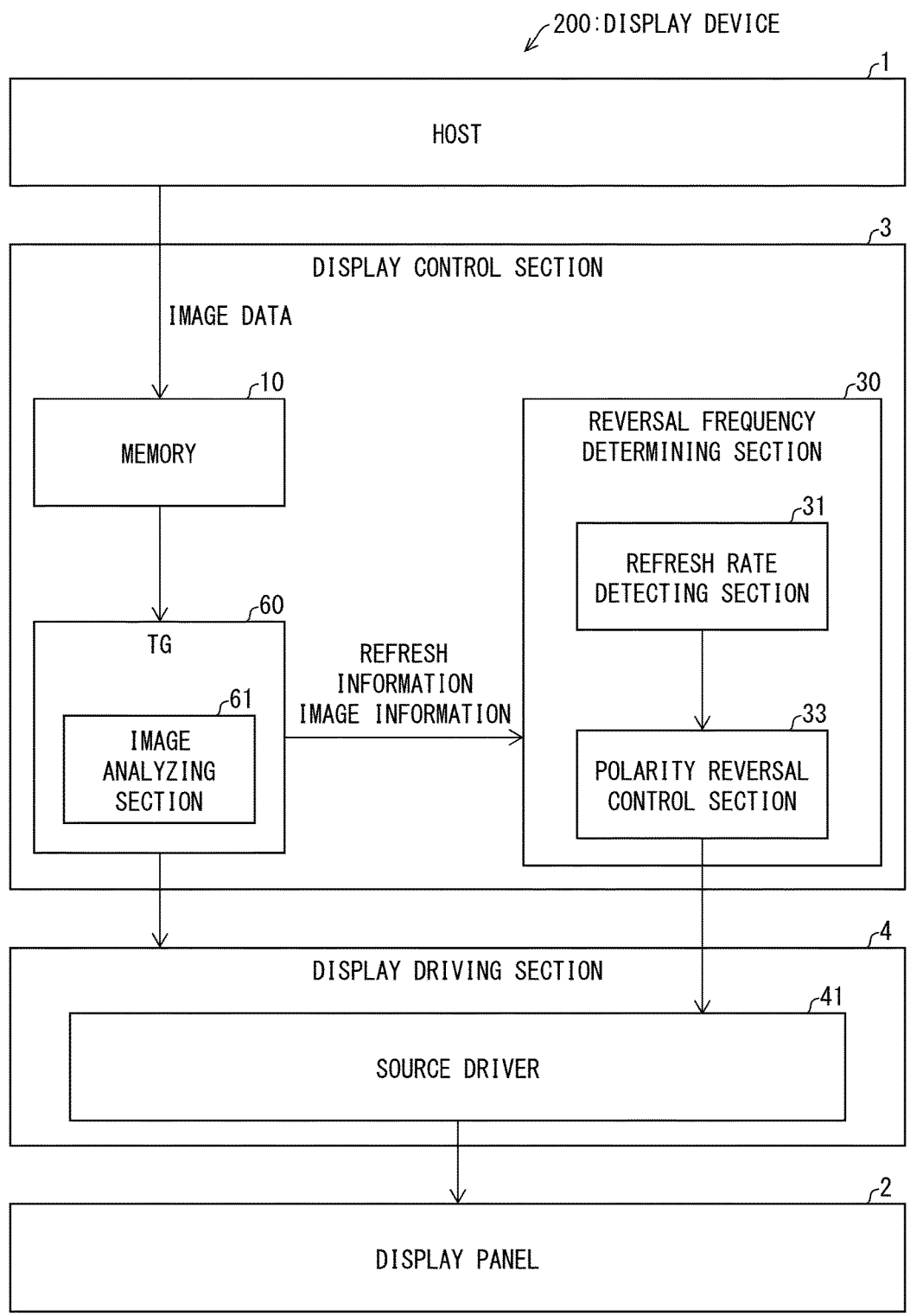
FIG. 5 is a block diagram illustrating a configuration of a main part of a display device in accordance with Embodiment 2 of the present invention.

FIG. 5 is a block diagram illustrating a configuration of a main part of a display device 200 in accordance with Embodiment 2. A TG 60 has an image analyzing section (image change determining section, flicker determining section) 61 in addition to the function of the TG 20. The image analyzing section 61 determines whether or not an image, which image data that the TG 60 has read from a memory 10 indicates, has such a characteristic that flicker is likely to be visually recognized by a user when the image is displayed on a display panel 2. When the TG 60 transmits refresh information to a reversal frequency determining section 30, the TG 60 transmits a result of such determination, which the image analyzing section 61 has made, to the reversal frequency determining section 30 as image information.

A criterion in accordance with which the image analyzing section 61 makes the determination is not limited in particular. For example, the image analyzing section 61 can be configured so as to (i) analyze brightness, chroma, hue, and the like of an image which image data indicates and (ii) in a case where a neutral color(s) is(are) used at a given proportion or higher, determine that the image is "an image which has a characteristic that flicker is likely to be visually recognized." Alternatively, for example, the image analyzing section 61 can be configured so as to (i) determine a polarity reversal method (a frame reversal driving method, a column reversal driving method, a line reversal driving method, a dot reversal driving method, or the like) which a source driver 41 employs and (ii) in a case where image data indicates an image which can be a killer pattern in a determined polarity reversal method, determine that the image is "an image which has a characteristic that flicker is likely to be visually recognized." For example, in a case where an image has a spatial frequency identical to that of a reversal driving method (for example, according to the column reversal driving method, an vertical striped image in which gradations are increased/decreased for each column), the image can be a killer pattern in the reversal driving method.

<<Polarity Reversal Control Process>>

Figure 6:
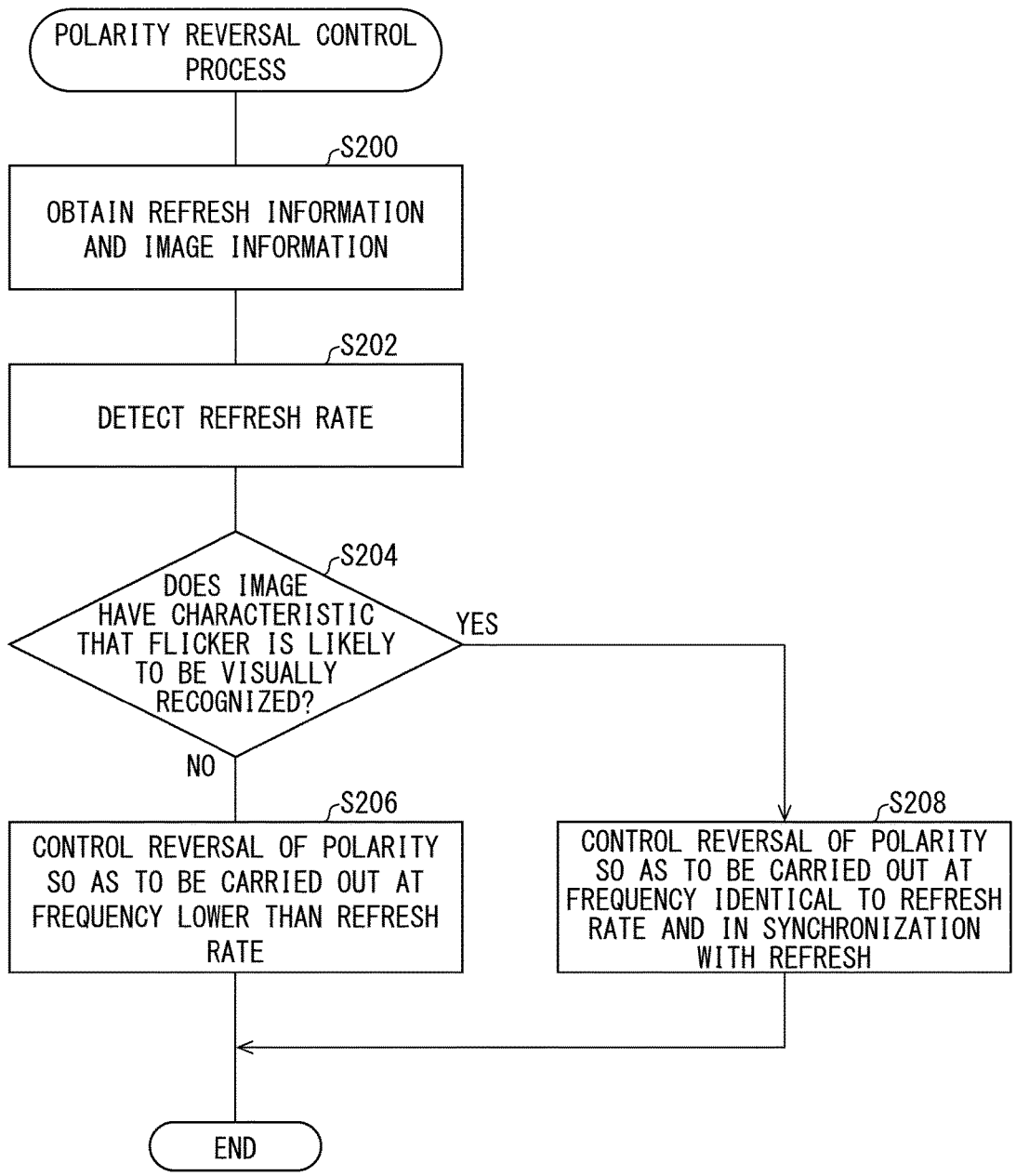
FIG. 6 is a flowchart illustrating a flow of a polarity reversal control process which a reversal frequency determining section of the display device carries out.

A polarity reversal control section 33 of the reversal frequency determining section 30 determines a frequency of reversal of polarity in accordance with the image information. Here, a flow of a polarity reversal control process which the reversal frequency determining section 30 including the polarity reversal control section 33 carries out will be described below with reference to FIG. 6. FIG. 6 is a flowchart illustrating a flow of the polarity reversal control process which the reversal frequency determining section 30 of Embodiment 2 carries out. In a case where the reversal frequency determining section 30 receives refresh information and image information from the TG 60 (S200), a refresh rate detecting section 31 detects a refresh rate of the display panel 2 (S202, detecting step). The polarity reversal control section 33 determines, in accordance with the image information, whether or not image data, which the TG 60 transmits to a display driving section 4, is image data on an image which has a characteristic that flicker is likely to be visually recognized (S204). Note that order in which S202 and S204 are carried out is not limited. In a case where the image data is image data on an image which does not have a characteristic that flicker is likely to be visually recognized (NO, in S204), the polarity reversal control section 33 controls the source driver 41 so that reversal of polarity of a data signal is carried out at a frequency lower than the refresh rate, by controlling respective frequencies of alternating-current voltages which the source driver 41 is to apply to respective source lines (S206, polarity reversal controlling step). In a case where the image data is image data on an image which has a characteristic that flicker is likely to be visually recognized (YES, in S204), the polarity reversal control section 33 controls the source driver 41 so that the reversal of the polarity of the data signal is carried out at a frequency identical to the refresh rate and in synchronization with refresh (S208).

<<Timings of Image Rewriting and Polarity Reversal>>

Figure 7:
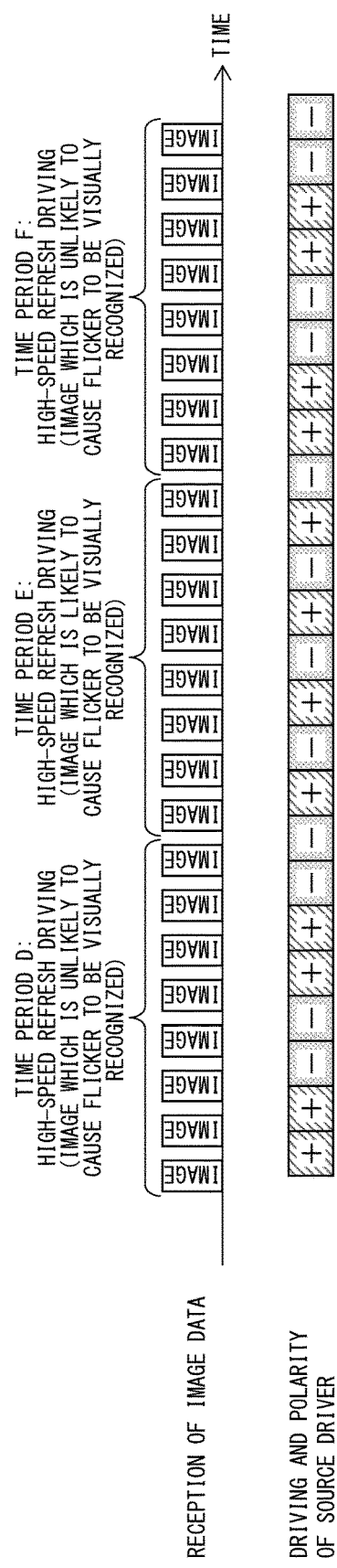
FIG. 7 is a view illustrating a relationship, among (i) a refresh rate of a display panel, (ii) a timing at which a source driver is driven, and (iii) polarity of a data signal corresponding to the source driver which is being driven, in the display device.

Finally, a relationship, among (i) a refresh rate of the display panel 2, ii) a timing at which the source driver 41 is driven, and (iii) polarity of a data signal corresponding to the source driver 41 which is being driven, in Embodiment 2 will he described below with reference to FIG. 7. 7 is a view illustrating a relationship, among (i) a refresh rate of the display panel 2, (ii) a timing at which the source driver 41 is driven, and (iii) polarity of a data signal corresponding to the source driver 41 which is being driven, in the display device 200. As illustrated in FIG. 47, the display panel 2 is driven by high-speed refresh driving in each of time periods D through F. Each of the time periods D and F is a time period in which image data, on an image which does not have a characteristic that flicker is likely to be visually recognized, that is, an image which is unlikely to cause flicker to be visually recognized, is transmitted from a host 1. The time period E is a time period in which image data, on an image which has a characteristic that flicker is likely to be visually recognized, that is, an image which is likely to cause flicker to be visually recognized, is transmitted from the host 1.

In a time period, such as the time period E, in which the image analyzing section 61 determined that an image which image data indicates is "an image which is likely to cause flicker to be visually recognized," the polarity reversal control section 33 of the reversal frequency determining section 30 which has received the image information indicative of a result of such determination controls the source driver 41 so that (i) a frequency of reversal of polarity is identical to the refresh rate and (ii) a timing of the reversal of the polarity is in synchronization with a timing of refresh.

In a time period, such as the time periods D and F, in which the image analyzing section 61 determined that an image which image data indicates is "an image which is unlikely to cause flicker to be visually recognized," the polarity reversal control section 33 controls the frequency of the reversal of the polarity so as to be lower than the refresh rate. For example, as illustrated in FIG. 7, the polarity reversal control section 33 controls the frequency of the reversal of the polarity so as to be lowered to 60 Hz which is a frequency similar to that in normal driving.

It is assumed that the display panel 2 displays an image which is unlikely to cause flicker to be visually recognized. In this case, even in a case where the frequency of the reversal of the polarity is lowered, flicker is unlikely to be visually recognized, as compared with a case where the display panel 2 displays an image which is likely to cause flicker to be visually recognized. By thus lowering the frequency of the reversal of the polarity in a time period in which an image which is unlikely to cause flicker to be visually recognized is displayed, it is possible to reduce electric power consumed in the reversal of the polarity, while maintaining a quality of display of image data on the display panel 2.

Note that the configuration described in Embodiment 1 can be combined with the configuration described in Embodiment 2. That is, in a case where (i) a refresh rate of the display panel 2 is equal to or higher than a given frequency and (ii) image data to be displayed on the display panel 2 indicates an image which is unlikely to cause flicker to be visually recognized, the polarity reversal control section 33 can control a frequency of reversal of polarity so as to be lower than the refresh rate. This makes it possible to lower the frequency of the reversal of the polarity merely under a situation where the refresh rate is high to some extent (for example, in a case where the high-speed refresh driving is carried out) and an image to be displayed on the display panel 2 is unlikely to cause flicker, that is, a situation where flicker is more unlikely to be visually recognized even in a case where the frequency of the reversal of the polarity is lowered. Therefore, it is possible to suppress electric power consumed in the reversal of the polarity, while maintaining a quality of screen display on the display panel 2.

[Embodiment 3]

Note that the image analyzing section 61 can be configured so as to, instead of determining whether or not an image which image data indicates is likely to cause flicker to be visually recognized, determine whether or not image data is changed from image data which was transmitted last time to the display driving section 4. The following description will discuss Embodiment 3 of the present invention with reference to FIG. 8.

In Embodiment 3, an image analyzing section 61 compares (i) image data which a TG 60 has read from a memory 10 and (ii) image data which the TG 60 transmitted to a display driving section 4 last time (in a last frame), and determines whether or not the image data which the TG 60 has read from the memory 10 is changed (different) from the image data which the TG 60 transmitted last time to the display driving section 4. The TG 60 transmits information indicative of a result of such determination, which the image analyzing section 61 has made, to a reversal frequency determining section 30 as image information.

A polarity reversal control section 33 of the reversal frequency determining section 30 determines a frequency of reversal of polarity in accordance with the image information. In a case where the image information indicates that the image data is changed from the image data which the TG 60 transmitted last time to the display driving section 4, the polarity reversal control section 33 controls the frequency of the reversal of the polarity so as to be identical to a refresh rate. In a case where the image information indicates that the image data is not changed from the image data which the TG 60 transmitted last time to the display driving section 4, the polarity reversal control section 33 controls a source driver 41 so that the frequency of the reversal of the polarity is lower than the refresh rate.

Figure 8:
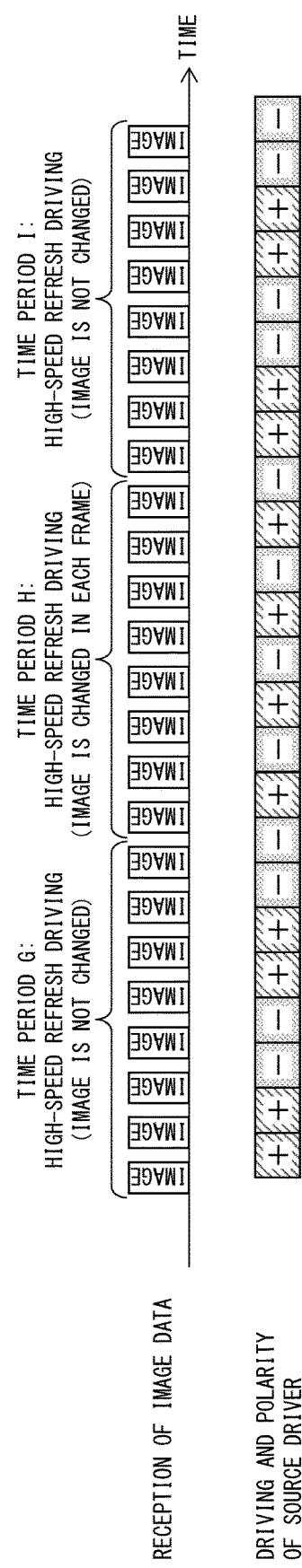
FIG. 8 is a view illustrating a relationship, among (i) a refresh rate of a display panel, (ii) a timing at which a source driver is driven, and (iii) polarity of a data signal corresponding to the source driver which is being driven, in a display device in accordance with Embodiment 3 of the present invention.

FIG. 8 is a view illustrating a relationship, among (i) a refresh rate of a display panel 2, (ii) a timing at which the source driver 41 is driven, and (iii) polarity of a data signal corresponding to the source driver 41 which is being driven, in Embodiment 3. As illustrated in FIG. 8, the display panel 2 is driven by high-speed refresh driving in each of time periods G through I, as with the case of FIG. 7. Each of the time periods G and I is a time period in which image data is not changed (the display panel 2 is displaying a still image). The time period H is a time period in which image data is changed in each frame (the display panel 2 is displaying a moving image).

In a time period, such as the time period H, in which image information transmitted from the image analyzing section 61 indicates that image data is changed, the polarity reversal control section 33 of the reversal frequency determining section 30 which has received the image information indicative of a result of such determination controls the source driver 41 so that (i) a frequency of reversal of polarity is identical to the refresh rate and (ii) a timing of the reversal of the polarity is in synchronization with a timing of refresh.

In a time period, such as the time periods G and I, in which image information transmitted from the image analyzing section 61 indicates that image data is not changed, the polarity reversal control section 33 controls the frequency of the reversal of the polarity so as to be lower than the refresh rate. For example, as illustrated in FIG. 8, the polarity reversal control section 33 controls the frequency of the reversal of the polarity so as to be lowered to 60 Hz which is a frequency similar to that in normal driving.

In a case where a still image is displayed on the display panel 2, it is less likely that a quality of display of image data is decreased due to image blur (tailing) or the like, as compared with a case where a moving image is displayed on the display panel 2, that is, a case where an image is changed in each frame on the display panel 2. Therefore, by (i) lowering the frequency of the reversal of the polarity in a case where a still image is displayed on the display panel 2 and (ii) not lowering the frequency of the reversal of the polarity in a case where a moving image is displayed on the display panel 2, it is possible to reduce electric power consumed in the reversal of the polarity, while maintaining a quality of display of image data on the display panel 2.

Note that the configuration described in Embodiment 3 can be combined with at least any one of the configurations described in Embodiments 1 and 2. That is, the polarity reversal control section 33 can determine whether or not to control a frequency of reversal of polarity so as to be lower than a refresh rate of the display panel 2, depending on at least any one of (i) the refresh rate of the display panel 2, (ii) whether or not an image which image data indicates and which is to be displayed on the display panel 2 is an image which is unlikely to cause flicker to be visually recognized, and (iii) whether or not an image which image data indicates is changed. This makes it possible to suppress electric power consumed in the reversal of the polarity, while maintaining a quality of screen display on the display panel 2.

[Variation]

In each of Embodiments 1 through 3, the TG 20 (or the TG 60) can be configured so as to (a) detect a refresh rate from (i) an interval at which the TG 20 (or the TG 60) transmits timing signals to the display control section 4 or (ii) time reference received from the host 1 and (b) transmit the refresh rate to the reversal frequency determining section 30 as refresh information. In this case, the reversal frequency determining section 30 does not need to have the refresh rate detecting section 31, and the polarity reversal control section 32 (or the polarity reversal control section 33) only needs to carry out the process, described in each of Embodiments 1 through 3, in accordance with the refresh rate which the refresh information indicates.

Furthermore, the process which the image analyzing section 61 in accordance with Embodiments 2 and 3 carries out can be carried out by the host 1. In that case, the host 1 only needs to transmit, to the display control section 3, image information together with image data, and the display control section 3 only needs to holds the image information in the memory 10 or the TG 60.

The polarity reversal control section 32 has been described on the premise that the polarity reversal control section 32 controls, in each frame (in each vertical period), reversal of polarity which reversal is caused to be carried out by the source driver 41. In other words, the polarity reversal control section 32 has been described on the premise that, even in a case where 1 (one) frame period becomes shorter due to, for example, the high-speed refresh driving, the polarity reversal control section 32 controls the source driver 41 in each frame. Alternatively, in each of Embodiments 1 through 3, merely in a case where it is intended that respective frequencies of alternating-current voltages, which the source driver 41 is to apply to the respective source lines, be changed (that is, a frequency of reversal of polarity be changed), the polarity reversal control section 32 can instruct the source driver 41 to change the respective frequencies of the alternating-current voltages. Then, the source driver 41 can change, in accordance with such an instruction, the respective frequencies of the alternating-current voltages which the source driver 41 is to output. According to such a configuration, it is not necessary to control the source driver 41 in each frame. Therefore, even in a case where 1 (one) frame period becomes shorter due to, for example, the high-speed refresh driving, it is possible to prevent control of the source driver 41 from being delayed. This is particularly effective, for example, in a case where (i) the reversal frequency determining section 30 is realized by software and (ii) a refresh rate of the display panel 2 is high.

[Software Implementation Example]

Each control block (in particular, the TG 20 or the TG 60, and the reversal frequency determining section 30) of the display control section 3 can be realized by a logic circuit (hardware) provided in an integrated circuit (IC chip) or the like or can be alternatively realized by software as executed by a central processing unit (CPU).

In the latter case, the display control section 3 includes: a CPU which executes instructions of a program that is software realizing the foregoing functions; a read only memory (ROM) or a storage device (each referred to as a "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Recap]

A control device (display control section 3) in accordance with a first aspect of the present invention is a control device capable of controlling a frequency of reversal of polarity of a data signal, which is to be written in each pixel of a display device (display device 100 or 200), so as to be changed, including: a detecting section (refresh rate detecting section 31) which detects a refresh rate of a display screen (display panel 2) of the display device; and a polarity reversal control section (polarity reversal control section 32 or 33) which controls the reversal of the polarity so as to be carried out at a frequency lower than the refresh rate which the detecting section has detected.

According to the above configuration, the polarity reversal control section allows a reduction in number of times of reversal of polarity per unit time, as compared with a case where a frequency of the reversal of the polarity is controlled so as to be identical to a refresh rate of the display screen. Therefore, it is possible to reduce electric power consumed in the reversal of the polarity, for example, electric power consumed in charge and discharge for the reversal of the polarity.

The control device in accordance with a second aspect of the present invention can be arranged such that, in the first aspect, the display device is configured such that the refresh rate of the display screen is capable of being changed; and in a case where the refresh rate, which the detecting section has detected, is equal to or higher than a given frequency, the polarity reversal control section controls the reversal of the polarity so as to be carried out at a frequency lower than the refresh rate.

According to the above configuration, the polarity reversal control section allows a reduction in electric power consumed in reversal of polarity, in a case where a refresh rate is equal to or higher than a given frequency. In particular, in a case where the given frequency is set so as to be high to such an extent that flicker becomes unlikely to be visually recognized on the display screen, the polarity reversal control section controls a frequency of the reversal of the polarity so as to be lower than the refresh rate when flicker is unlikely to be visually recognized. This makes it possible to reduce electric power consumed in the reversal of the polarity, while ensuring a quality of display of an image on the display screen.

The control device in accordance with a third aspect of the present invention can be arranged such that, in the second aspect, in a case where the refresh rate, which the detecting section has detected, is equal to or higher than the given frequency, the polarity reversal control section controls the reversal of the polarity so as to be carried out at a frequency lower than a second refresh rate (refresh rate in a case where normal driving is carried out) which is a refresh rate of the display device and which is lower than the given frequency.

As a frequency of reversal of polarity is lowered, electric power consumed in the reversal of the polarity is reduced. Therefore, according to the above configuration, it is possible to further reduce electric power consumed in the reversal of the polarity.

The control device in accordance with a fourth aspect of the present invention can be arranged so as to, in any one of the first through third aspects, further include an image change determining section (image analyzing section 61) which determines whether or not an image which the display device is to display is changed from an image which the display device displayed in a last frame, in a case where the image change determining section determines that the image which the display device is to display is not changed from the image which the display device displayed in the last frame, the polarity reversal control section controlling the reversal of the polarity so as to be carried out at a frequency lower than the refresh rate.

As compared with a case where an image which is to be displayed on the display screen is changed from one that was displayed in a last frame, in a case where the image is not changed, it is less likely that a quality of display of the image is decreased due to image blur or the like. Therefore, by lowering a frequency of reversal of polarity in a case where an image to be displayed on the display screen is not changed, it is possible to reduce electric power consumed in the reversal of the polarity, while ensuring a quality of display of the image on the display screen.

The control device in accordance with a fifth aspect of the present invention can be arranged so as to, in any one of the first through fourth aspects, further include a flicker determining section (image analyzing section 61) which determines whether or not an image which the display device is to display has a characteristic that flicker is likely to be visually recognized, in a case where the flicker determining section determines that the image which the display device is to display does not have the characteristic that the flicker is likely to be visually recognized, the polarity reversal control section controlling the reversal of the polarity so as to be carried out at a frequency lower than the refresh rate.

It is assumed that the display screen is to display an image which does not have a characteristic that flicker is likely to be visually recognized. In this case, even in a case where a frequency of reversal of polarity is lowered, flicker is unlikely to be visually recognized, as compared with a case where the display screen is to display an image which has a characteristic that flicker is likely to be visually recognized. Therefore, according to the above configuration, by lowering the frequency of the reversal of the polarity in a case where an image which does not have a characteristic that flicker is likely to be visually recognized is to be displayed on the display screen, it is possible to reduce electric power consumed in the reversal of the polarity, while ensuring a quality of display of the image on the display screen.

A display device in accordance with a sixth aspect of the present invention is a display device which is configured such that polarity of a data signal, which is to be written in each pixel, is reversed in accordance with control carried out by a control device recited in any one of the first through fifth aspects.

According to the above configuration, it is possible to bring about an effect similar to that brought about by the control device in accordance with any one of the first through fifth aspects.

A control method in accordance with a seventh aspect of the present invention is a control method (polarity reversal control process) carried out by a control device capable of controlling a frequency of reversal of polarity of a data signal, which is to be written in each pixel of a display device, so as to be changed, the method including: a detecting step (S102 or S202) of detecting a refresh rate of a display screen of the display device; and a polarity reversal controlling step (S106 or S206) of controlling the reversal of the polarity so as to be carried out at a frequency lower than the refresh rate detected in the detecting step.

According to the above configuration, it is possible to bring about an effect similar to that brought about by the control device in accordance with the first aspect.

The control device in accordance with each aspect of the present invention can be realized by a computer. In this case, the scope of the present invention also encompasses (i) a control program for causing a computer to realize the control device by causing the computer to operate as each section (software element) included in the control device and (ii) a computer-readable recording medium in which the control program is recorded.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

INDUSTRIAL APPLICABILITY

The present invention can be suitably used for a control device which controls polarity of a data signal to be written in each pixel of a display device, and the like. In particular, the present invention can be suitably used for a case where a reduction in electric power that a display device consumes is required, for example, for a mobile terminal.

REFERENCE SIGNS LIST

100, 200 Display device
1 Host
2 Display panel (display screen)
3 Display control section (control device)
4 Display driving section
10 Memory
20, 60 TG
61 Image analyzing section (image change determining section, flicker determining section)
30 Reversal frequency determining section
31 Refresh rate detecting section (detecting section)
32, 33 Polarity reversal control section
41 Source driver

The invention claimed is:

1. A control device capable of controlling a frequency of reversal of polarity of a data signal, which is to be written in each pixel of a display device, so as to be changed, comprising:
   a detecting section which detects a refresh rate of a display screen of the display device; and
   a polarity reversal control section which controls the reversal of the polarity so as to be carried out at a frequency lower than the refresh rate which the detecting section has detected,
   wherein:
   the display device is configured such that the refresh rate of the display screen is capable of being changed; and
   in a case where the refresh rate, which the detecting section has detected, is equal to or higher than a given frequency, the polarity reversal control section controls the reversal of the polarity so as to be carried out at a frequency lower than the refresh rate.

2. The control device as set forth in claim 1, wherein, in a case where the refresh rate, which the detecting section has detected, is equal to or higher than the given frequency, the polarity reversal control section controls the reversal of the polarity so as to be carried out at a frequency lower than a second refresh rate which is a refresh rate of the display device and which is lower than the given frequency.

3. A display device which is configured such that polarity of a data signal, which is to be written in each pixel, is reversed in accordance with control carried out by a control device recited in claim 1.

4. A non-transitory computer-readable storage medium storing therein a control program for causing a computer to function as a control device recited in claim 1, the control program causing the computer to function as a detecting section and a polarity reversal control section.

5. A control device capable of controlling a frequency of reversal of polarity of a data signal, which is to be written in each pixel of a display device, so as to be changed, comprising:

a detecting section which detects a refresh rate of a display screen of the display device;

a polarity reversal control section which controls the reversal of the polarity so as to be carried out at a frequency lower than the refresh rate which the detecting section has detected; and an image change determining section which determines whether or not an image which the display device is to display is changed from an image which the display device displayed in a last frame, in a case where the image change determining section determines that the image which the display device is to display is not changed from the image which the display device displayed in the last frame, the polarity reversal control section controlling the reversal of the polarity so as to be carried out at a frequency lower than the refresh rate.

6. A control device capable of controlling a frequency of reversal of polarity of a data signal, which is to be written in each pixel of a display device, so as to be changed, comprising:

a detecting section which detects a refresh rate of a display screen of the display device;

a polarity reversal control section which controls the reversal of the polarity so as to be carried out at a frequency lower than the refresh rate which the detecting section has detected; and a flicker determining section which determines whether or not an image which the display device is to display has a characteristic that flicker is likely to be visually recognized, in a case where the flicker determining section determines that the image which the display device is to display does not have the characteristic that the flicker is likely to be visually recognized, the polarity reversal control section controlling the reversal of the polarity so as to be carried out at a frequency lower than the refresh rate.

7. A control method carried out by a control device capable of controlling a frequency of reversal of polarity of a data signal, which is to be written in each pixel of a display device, so as to be changed, the method comprising:

a detecting step of detecting a refresh rate of a display screen of the display device; and a polarity reversal controlling step of controlling the reversal of the polarity so as to be carried out at a frequency lower than the refresh rate detected in the detecting step;

wherein:

the display device is configured such that the refresh rate of the display screen is capable of being change; and in a case where the refresh rate, which the detecting step has detected, is equal to or higher than a given frequency, the polarity reversal controlling step controls the reversal of the polarity so as to be carried out at a frequency lower than the refresh rate.

* * * * *